United States Patent [19]

Grigoli et al.

[11] Patent Number: 5,085,059
[45] Date of Patent: Feb. 4, 1992

[54] MACHINE FOR MAKING STICK ICES, WATER ICES, AND THE LIKE

[75] Inventors: Franco Grigoli; Franco Trabacchi, both of Milan, Italy

[73] Assignee: Sidam S.R.L., Cormano, Italy

[21] Appl. No.: 562,220

[22] Filed: Aug. 1, 1990

[30] Foreign Application Priority Data

Nov. 10, 1989 [IT] Italy .............................. 22345 A/89

[51] Int. Cl.⁵ .............................................. A23G 9/18
[52] U.S. Cl. .................................... 62/345; 198/465.3; 425/253; 425/588
[58] Field of Search ................... 62/345; 425/253-255, 425/588; 198/465.1, 465.3

[56] References Cited

U.S. PATENT DOCUMENTS 2,884,875  5/1959  Rasmusson ...................... 62/345 X
3,618,334 11/1971  Gram ................................... 62/345
4,530,214  7/1985  Ellsworth et al. ................ 62/345 X
4,576,562  3/1986  Anderson ......................... 62/345 X
4,611,468  9/1986  Degn ................................. 62/345 X Primary Examiner—William E. Tapolcai
Attorney, Agent, or Firm—McGlew & Tuttle

[57] ABSTRACT

The machine comprises a plurality of mold plates moving along two superposed pairs of guides. Arranged in sequence along the upper guides are a mold filling device, a freezing tank, a stick inserting device, means for removing the freezed product. Arranged at the two ends of the machine are means capable of receiving a mold plate at its exit from the upper guides to bring it to the lower guides, and conversely, without the mold plates being overturned. The mold plates on the lower guides are moved at higher speed than the mold plates on the upper guides.

8 Claims, 2 Drawing Sheets

MACHINE FOR MAKING STICK ICES, WATER ICES, AND THE LIKE

FIELD OF THE INVENTION

This invention relates to a machine for making ices, water ices, or the like, whether with or without an inserted stick, and, more specifically, it concerns a machine of the linear type, that is one in which the plates with the molds for the product to be freezed, are moved substantially in a straight path between the filling step and the finished product removing step.

One characterizing feature of the machine according to the invention resides in that means are provided for receiving the mold plates after removal of product therefrom, and returning the mold plates to their starting position without overturning them and at a higher speed than the speed by which the mold plates are moved during the production cycle.

BACKGROUND OF THE INVENTION

Machines known at present for making stick ices can be considered as falling into two broad classes including rotary and linear machines, respectively.

Both of these known types of machines comprise a plurality of plates, each provided with a given number of molds and moving in a fixed path, and, arranged along this path, a measuring device for filling the molds, a brine-containing freezing tank, a stick-inserting device for introducing a stick in the semi-freezed product, and a device for removing a finished product from molds.

In the rotary-type machines, the plates with the molds are in the shape of a circular crown arc and are arranged close adjacent to each other so as to form, as a whole, a plane, endless circular crown which is advanced step by step.

This rotary type of machine has advantages, as compared with the linear type, in that there are no losses of product, since the traveling molds are at any time maintained in a same plane without overturning, and in that waiting time is minimized between thawing and subsequent filling and freezing steps, which steps are conducted at sufficiently short intervals of time to prevent any bacterial charges from developing in the molds as a result of the presence of product therein not removed by washing. The short waiting time between thawing and subsequent filling and freezing steps permits avoiding the need for washing the molds at the end of each cycle, thereby to save energy and to minimize brine consumption, in addition to avoiding loss of liquid product in the molds from thawing and withdrawing steps.

On the other hand, the rotary type machine has a number of disadvantages among which, in particular, the difficulties encountered in replacing the mold carrying plates since these plates are fitted to associated guides by means of metal joints sealingly screewed up through interventing silicone plastic packings or the like; the troublesome handling of same plates; as well as the fact that the different apparatus and devices mounted to this type of machine are difficult to install and/or to operate, the access to the central zone of the machine is extremely hard and, finally, in these rotary machines any product failing to be withdrawn from a mold must be removed by hand urgently.

This is a particularly troublesome difficulty.

It may, in fact, happen that an ice fails to be withdrawn from its mold, due, for example, to breaking of the ice-supporting stick or from other reasons; in this case, the operator has to empty the mold by hand but he has an extremely short time available for doing it. The mold carrying plates are, in fact, moved automatically so that a mold still containing a product could, at a next run, be again brought under the filling device. Thus, an operator is required to be permanently present to check good operation of the machine and to promptly intervene in order to prevent a further amount of product from being discharged onto an already filled mold and, therefore, from being spattered about: a very troublesome situation indeed.

In the machines of the second class, the linear types, the mold carrying plates are fastened to a driving chain running around a pair of toothed wheels, and are moved in a path comprising an upper straight portion with the measuring, freezing and withdrawing devices being arranged therealong, and a lower portion on which the plates are moved back in an overturned condition.

This solution has an advantage when compared with the rotary machine solution, in that any product not withdrawn from a mold will free itself of the mold —when this is moving on the lower portion of its path—as soon as thawing commences.

Moreover, in this type of machine, replacement of the molds, which are in the form of strips fastened to conveyor chains through bayonet joints, is facilitated, the same being true for the mounting of the various complementary apparatus.

However, some difficulties are connected to these latter machines owing to the long time interval between withdrawal of the finished product and subsequent filling of the molds, during which interval the mold plates run the lower portion of their path. This interval of time imposes, in fact, a washing of the molds in order to prevent formation of bacterial charges on that portion of product still adhering to mold walls. As a result, water and brine consumptions are higher and there is a loss in product, since that product remaining in the mold after ice withdrawal is not recovered, as is the case, on the contrary, with the machines of the circular type.

SUMMARY AND OBJECTS OF THE INVENTION

Thus, the need is felt in the field of industrial production of ices, for a machine which permits overcoming, at least in part, the above difficulties, namely a machine in which access to all parts thereof is made easier, in which the molds can be replaced in a fast and simple manner and do not require washing at each production cycle, and in which the product remaining in the molds after ice-removal can be recovered.

Moreover, such a machine should enable any product remaining in a mold to be easily removed by hand, if required, and should preferably be more compact in size than conventional linear machines are.

Furthermore, such a machine should not be higher in cost as compared with machines known at present.

The above and other advantages are achieved by this invention, which provides a machine in which the mold plates are moved along two superposed pairs of guides at the ends of which guides there are provided devices capable of receiving each individual mold plate from one pair of guides to charge it onto the other pair of guides, and in which machine the speed by which the mold plates are moved on the return portion of their travel is higher than the speed by which the mold plates are advanced during the production cycle.

BRIEF DESCRIPTION OF THE DRAWINGS

One embodiment of the invention will now be described in details by way of a non limiting example, reference being made to the accompanying drawings, in which.

DETAILED DESCRIPTION OF THE PREFERRED EMBODIMENT

Figure 1:
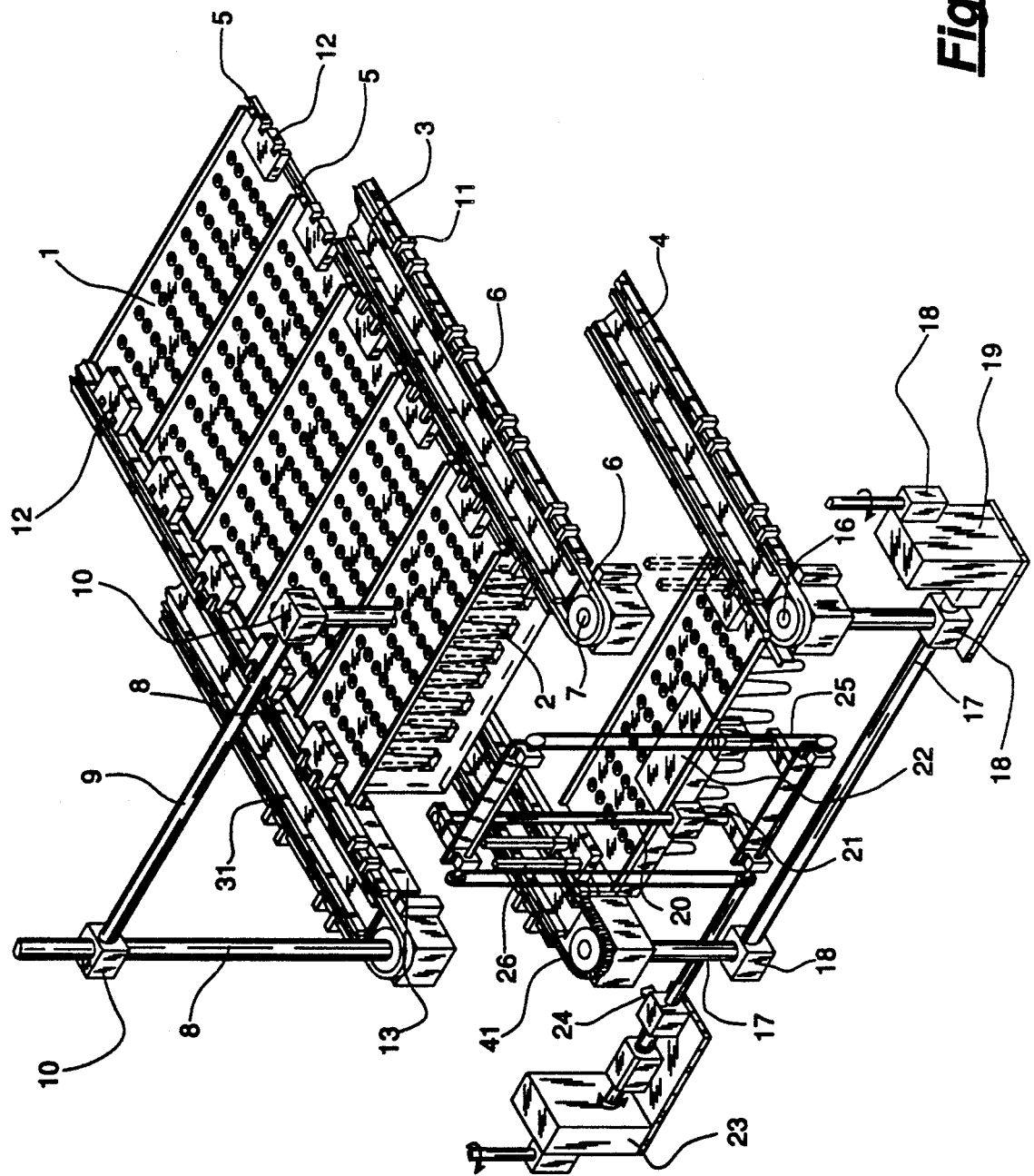
FIG. 1 is a schematic exploded view of an end part of a machine for making ices according to the invention.

Referring to the above figures, a machine for making stick ices on an industrial scale, according to the invention, comprises a plurality of plates 1 each provided with several rows of molds 2 and being moved along two pairs of guides 3,3' and 4,4' arranged above one another.

These guides may be of any suitable shape in cross-section, for example, of angle or channel shape.

Each mold plate 1 has a pair of idle rollers, wheels or shoes 5 provided at the sides thereof, which bear against the associated plate-supporting guides thereby permitting the plate to slide freely.

Each guide 3,3' has an endless belt or chain 6, or the like, running thereon, each chain or belt being mounted to a pair of wheels (only one shown) of vertical axis 7, which are rotatably driven from a motor, not shown, through a linkage including shafts 8 and 9 connected through bevel gear pairs 10 or the like.

Thus, the belts 6 run synchronously at the same speed.

Each belt 6 has regularly spaced apart pairs of teeth 11 fitted thereto for engagement with corresponding pins or teeth 12 which are fastened to plates 1 so as to project out of the sides of the plates. Therefor, the plates 1 are bearing on the guides 3,3' with respect to which the plates 1 can freely slide and are caused to advance by the belts 6 through the belt teeth 11.

The spacing between two successive pairs of teeth 11 is equal to the length of a plate 1 so that the plates 1, while advancing, are disposed in side-by-side contact relationship with each other to form a sort of continuous mat, slippingly moving along guides 3,3'.

These guides 3,3' are not of integral construction but have at their ends a terminal, hingedly connected part 13 that is able to rotate about an axis substantially parallel to the associated guide, from an operating position in which this terminal part 13 is aligned with the guide 3,3' and forms an extension thereof, to a retracted position (shown FIG. 1) in which it permits the corresponding adjacent mold plate to be moved in a vertical direction.

To this end, the terminal part 13 should be of a length substantially equal to, or slightly greater than the width of one plate 1.

Figure 2:
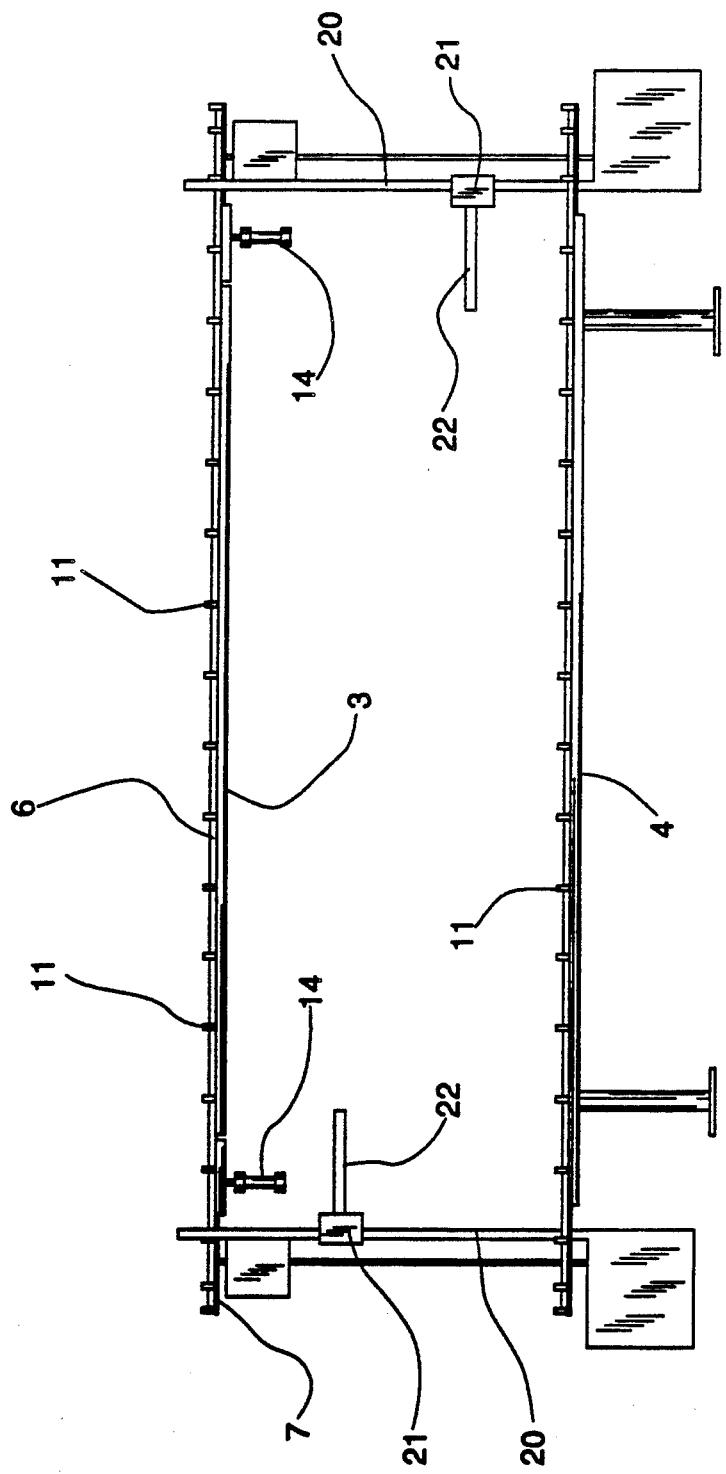
FIG. 2 is a schematic side view of the same machine.

Rotations of the terminal part 13 are operated by a plunger 14 or the like (FIG. 2) but other mechanical or electrical actuators may be provided to this end, as required.

The lower guides 4,4', like the upper guides 3,3', are each equipped with a belt or the like 41 having teeth 15 and running on wheels 16 rotatably driven through shafts 17 and bevel gear pairs 18 from an electric motor 19 or the like.

In this case too, as in the preceding case, the shafts that transmit motion to both belts 41 are rigidly coupled to one another, whereby the belts 41 are in turn moved at the same speed, which speed is, however, significantly higher than the speed of belts 6.

Mounted to both ends of the machine are devices designed to receive the mold plates leaving the upper guides to bring them to the lower guides, and conversely.

These devices comprise each a pair of uprights 20 having sliders 21 slidably movable thereon and, secured to said sliders 21, an element 22 for receiving a mold plate 1.

By way of example, the element 22 may be in the form of a fork whose branches will fit between the molds formed in a plate 1, or it may be a support plate on which the mold plate will rest, or any other equivalent means.

Movements of the sliders 21 and the plate support 22 up and down the uprights 20 are operated from a motor 23 through a transmission including a shaft 24 and a pair of endless belts 25 or the like.

The means for causing lifting and lowering of mold plate support 22 may be of various types. For example, the support 22 may be directly fastened to belts 25, or the shafts 20 may be in the form of screw spindles that are rotatably driven about their own axis.

The movements of said device for lifting and lowering a mold plate are synchronized with the movements of belts 6 and 41.

The synchronizing devices may also be of various types, for example, they may be of mechanical or electronic type, operated through encoders, etc., or of electromechanical type utilizing, for example, a stepper motor, etc., a choice being made according to design requirements or based on cost considerations, etc..

The machine of the invention operates as follows.

The plates 1 with associated molds are moved along guides 3,3', through the guide belts 6 whose teeth 11 engage with the corresponding teeth 12 at the ends of each mold plate 1.

The mold plates 1 are advanced in close contact with each other to be first brought to a product measuring station, where the molds are filled, then to a freezing tank.

On continuing their travel through the freezing tank, the plates come to a stick inserting device by which one or two sticks are introduced in each mold when the product is partially solidified therein. When the plates attain the end of the freezing tank, the product in each mold is in a solid state, ready for removal from molds.

At that time, the frozen product is withdrawn and the mold plate is moved to the ends of guides 3,3' where the movable guide parts 13 are provided.

In the meantime, the plate receiving elements 22 have been moved up to the level of guides 3,3' to receive the coming plate.

When this plate is properly positioned in front of movable parts 13, these are lowered by the plungers 14, whereupon the control devices of the machine operate the motor 23 which, through linkage means connected thereto, causes the support 22 to descend together with plate 1 until this plate will rest on the lower guides 4,4'.

During the descent, the teeth 12 of the plate are guided by pairs of uprights 26 and when the plate attains the lower guides, said teeth 12 will engage between the teeth 15 of belts 41.

At that time, the movable parts of the upper guides are rotated to their up position and, at the same time, the belts 41 are put in motion whereby the lowered mold plate is caused to slide along the lower guides to attain the other end of these guides where a similar device to that described above will receive the plate and move it upwardly to a position in front of upper guides 3,3'.

As mentioned before, the belts 41 are driven at a higher rate than the belts 6 and such that the time required for the lower plate to travel all along the length of the machine is substantially the same as required for the upper mold plates to advance by a step, that is an amount equal to the length of one plate.

Thus, the returned plate is filled again and can immediately commence a new cycle without having to wait until an entire ice production cycle is completed, as is the case with conventional linear machines.

In substance, in the machine according to the invention, as soon as a product is removed, each plate, with associated molds, is immediately returned to its starting position for a new cycle in a time equal to that necessary for a mold plate to advance by a number of steps corresponding to its length.

By this system, several advantages are obtained:

the cost of the machine is significantly reduced, since it is sufficient a number of molds as small as half the number of molds used in a conventional linear machine of the same capacity in which, if continuous production is desired, the molds are to be provided in both the upper and lower parts of the mold plate path;

losses of product are avoided, since in no case the mold plates are overturned but the mold plates are moved while held parallel to themselves;

as a result of this latter feature, washing of the molds at the end of each cycle is no longer required, which makes for power and brine saving;

the machine is easily accessible in all of its parts so that maintenance and mold replacement are facilitated;

time interval between thawing and subsequent filling step is minimized and even manual withdrawing of product from a mold, if necessary, is facilitated.

The above described embodiment has been given as an example only and several changes and modifications may be made thereto by those skilled in the art, without departing from the spirit and scope of the invention as defined in the appended claims.

We claim:

1. In a machine for making sorbets, ices with or without an inserted stick, including moving molds along a path with devices for filling the molds, freezing the filled product and then removing the frozen product, the improvement comprising: first guide means including production guide elements for moving mold plates, in succession, from a starting location to an end location, beyond the devices; and second guide means for returning mold plates to said starting location, including return guide elements positioned beneath said production guide, said second guide means moving said mold plates along said return guide elements at a higher speed than said first guide means moves the mold plates along the production guide elements.

2. A machine according to claim 1, further comprising: ascent and descent means, positioned at said starting position and at said end position, for receiving a mold plate from said first guide means at said end location and moving said mold plate to said second guide means and for moving said mold plate from said second guide means at said starting location to said first guide means at said starting position, without overturning said mold plate.

3. A machine according to either claim 1 or claim 2, wherein said mold plates include one of idle wheels, rollers and shoes for bearing on said guide elements, each of said guide elements of said first and second guide means including a drive belt with teeth, said teeth being positioned on said drive belt, spaced apart by a distance equal to a length of one mold plate, said teeth of said drive belt engaging with corresponding teeth formed integral with said mold plates, whereby teeth of said drive belt engage teeth of said mold plates for advancing said mold plates.

4. A machine according to claim 3, wherein a speed ratio between said first guide means and said second guide means is provided whereby said second drive means is provided with a drive speed which is related to a drive speed of said first drive means, said second drive means drive speed being set such that the time required for a mold plate to move from said end position to said starting position, along said return guide elements, equals the time required for said first drive means to move a mold plate by a distance corresponding to a length of one mold plate.

5. A machine according to claim 1, wherein said first guide means includes moveable end parts which are positioned for rotation from a position in which they form an extension of said production guide elements to a retracted position enabling mold plates to descend to said second guide means.

6. A machine according to claim 5, wherein said moveable end parts from a moveable support positioned at both ends of said first guide means for receiving a mold plate, said moveable support being moveable from a position in front of said first guide means to a position in front of said second guide means wherein movement of said moveable support is synchronized with the advancing movement of said mold plates.

7. A machine for making sorbets, ices with or without an inserted stick, comprising first guide means including a first side guide and a second side guide; a plurality of mold plates, said mold plates being positioned in succession, supported by said first side guide and said second side guide of said first guide means, said first guide means for moving said mold plates from a start end to a finish end, wherein said mold plates are moved, in succession, to devices for forming said sorbets, ices with or without an inserted stick; a second guide means, said second guide means including a first side guide and a second side guide, said second guides means being positioned beneath said first guide means and extending from said start end to said finish end, for moving mold plates from said finish end to said start end; first ascent and descent means positioned at said finish end for receiving an individual mold plate and moving the mold plate, without overturning it, from said first guide means to said second guide means; and, second ascent and descent means, positioned at said start end, for receiving an individual mold plate and moving the mold plate, without overturning it, from said second guide means to said first guide means, each of said first guide means and said second guide means guides include a belt provided with teeth, said teeth being spaced apart by a distance equal to a length of one mold plate, each of said plurality of mold plates includes teeth for engagement with corresponding teeth of said guides, wherein the engagement between teeth of said guides and teeth of said mold plates causes said mold plates to advance.

8. A machine for making sorbets, ices with or without an inserted stick, comprising first guide means including a first side guide and a second side guide; a plurality of mold plates, said mold plates being positioned in succession, supported by said first side guide and said second side guide of said first guide means, said first guide means for moving said mold plates from a start end to a finish end, wherein said mold plates are moved, in succession, to devices for forming said sorbets, ices with or without an inserted stick; a second guide means, said second guide means including a first side guide and a second side guide, said second guides means being positioned beneath said first guide means and extending from said start end to said finish end, for moving mold plates from said finish end to said start end; first ascent and descent means positioned at said finish end for receiving an individual mold plate and moving the mold plate, without overturning it, from said first guide means to said second guide means; and, second ascent and descent means, positioned at said start end, for receiving an individual mold plate and moving the mold plate, without overturning it, from said second guide means to said first guide means, wherein said first guide means includes an end part positioned at said finished end, said end part being mounted to each of said guides and being rotatable from a support position to a retracted position allowing the mold plate to descend.

* * * * *